United States Patent [19]
Newell

[11] 3,929,204
[45] Dec. 30, 1975

[54] TRAILER CRANE WITH OUTRIGGER TO CRAWLER CONVERSION

[76] Inventor: Lawrence Hugh Newell, 7316 143rd St. West, Apple Valley, Minn. 55124

[22] Filed: Jan. 22, 1975

[21] Appl. No.: 543,175

[52] U.S. Cl............... 180/9.2 C; 180/9.26; 212/145
[51] Int. Cl.² ......................................... B62D 55/04
[58] Field of Search............... 180/9.26, 9.2 R, 9.26, 180/9.3, 9.42; 305/15; 212/145

[56] References Cited
UNITED STATES PATENTS

| 2,057,211 | 5/1975 | Shere | 180/9.2 L |
| 3,382,943 | 5/1975 | Anderson | 180/9.2 R |

*Primary Examiner*—Philip Goodman
*Attorney, Agent, or Firm*—Stuart R. Peterson

[57] ABSTRACT

Conventionally, a trailer carrying a crane thereon is pulled by a tractor to the site where the crane is to be employed, reliance thereafter still being made on the tractor in order to move the crane from one vantage point to another. Provision is herein made for substituting hydraulically powered crawlers for the usual outrigger jacks, thereby enabling the trailer to be uncoupled from the tractor and more readily maneuvered into the various vantage positions in order to perform a given task.

12 Claims, 12 Drawing Figures

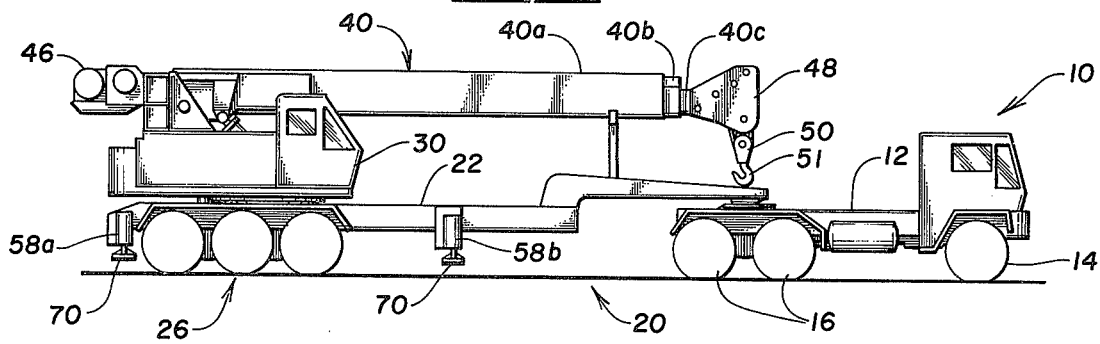
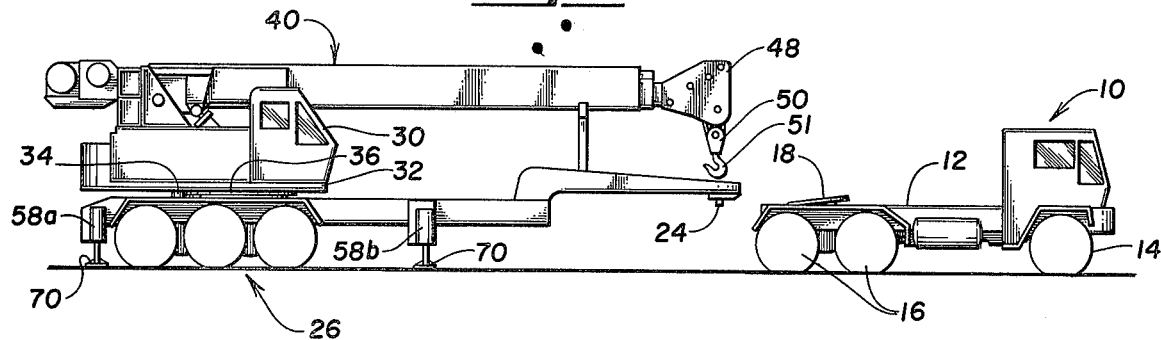
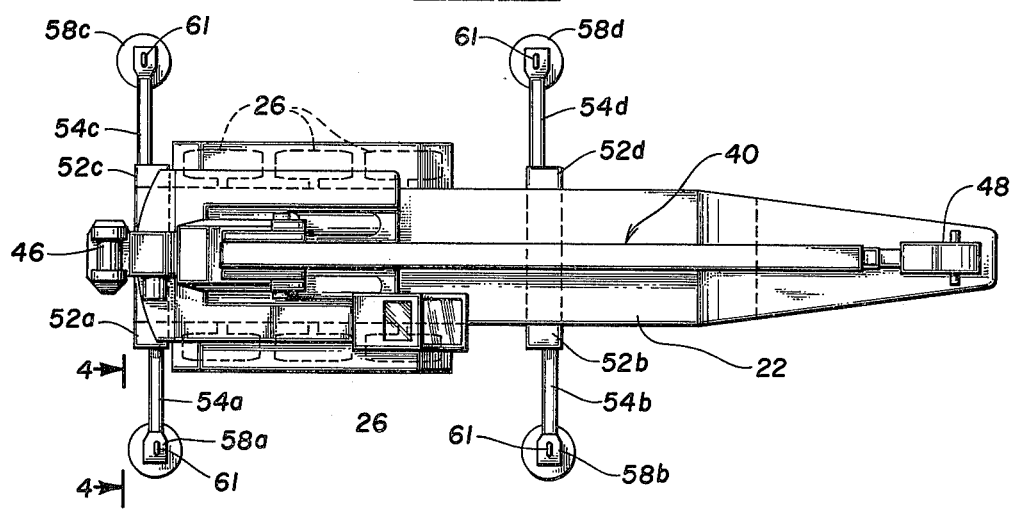

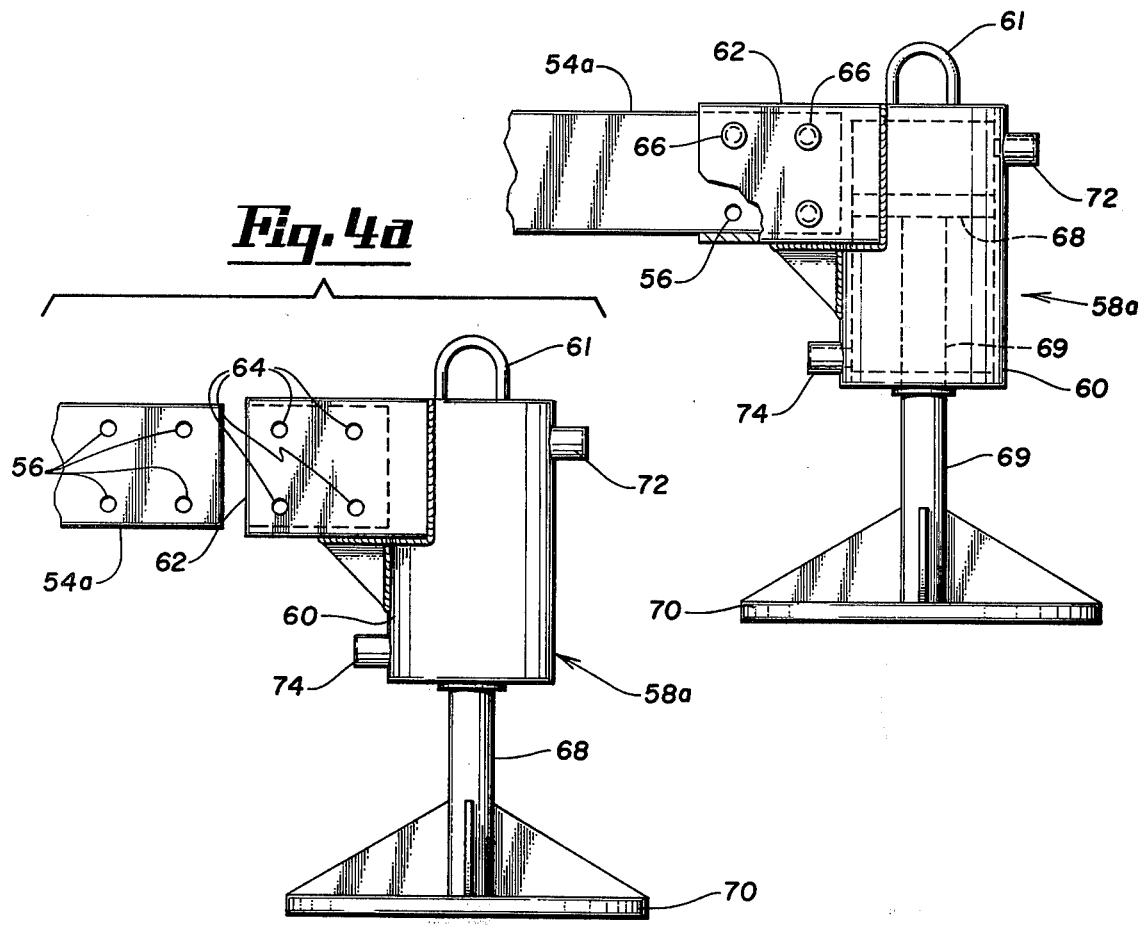
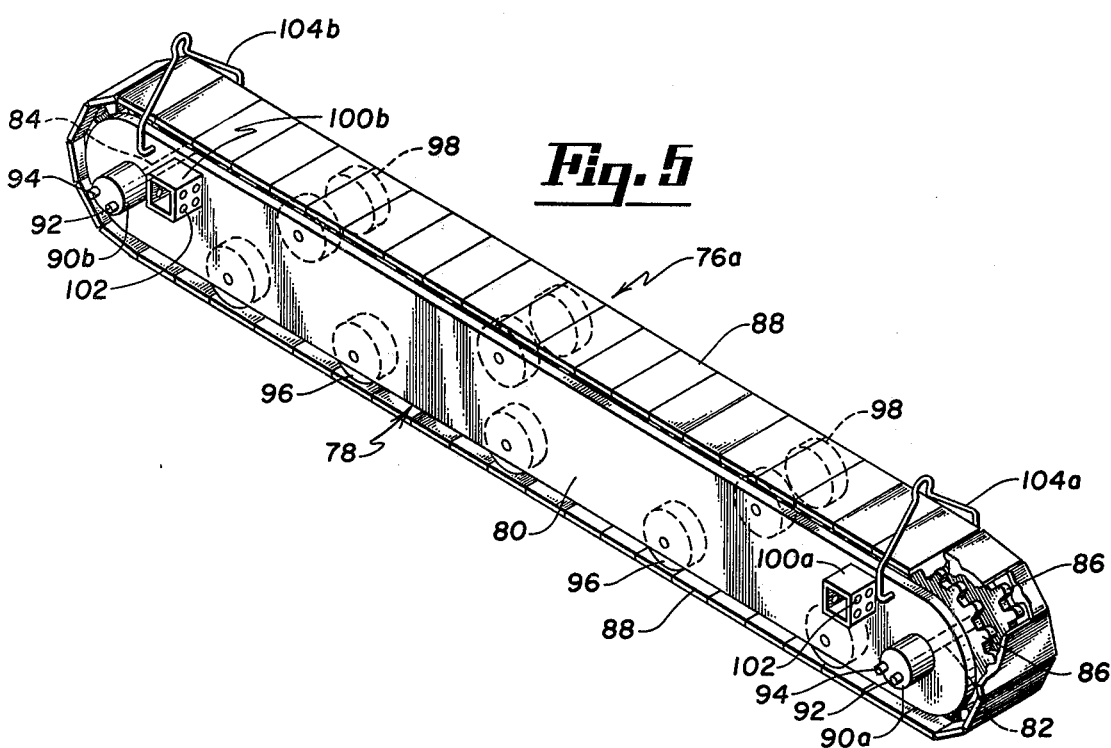

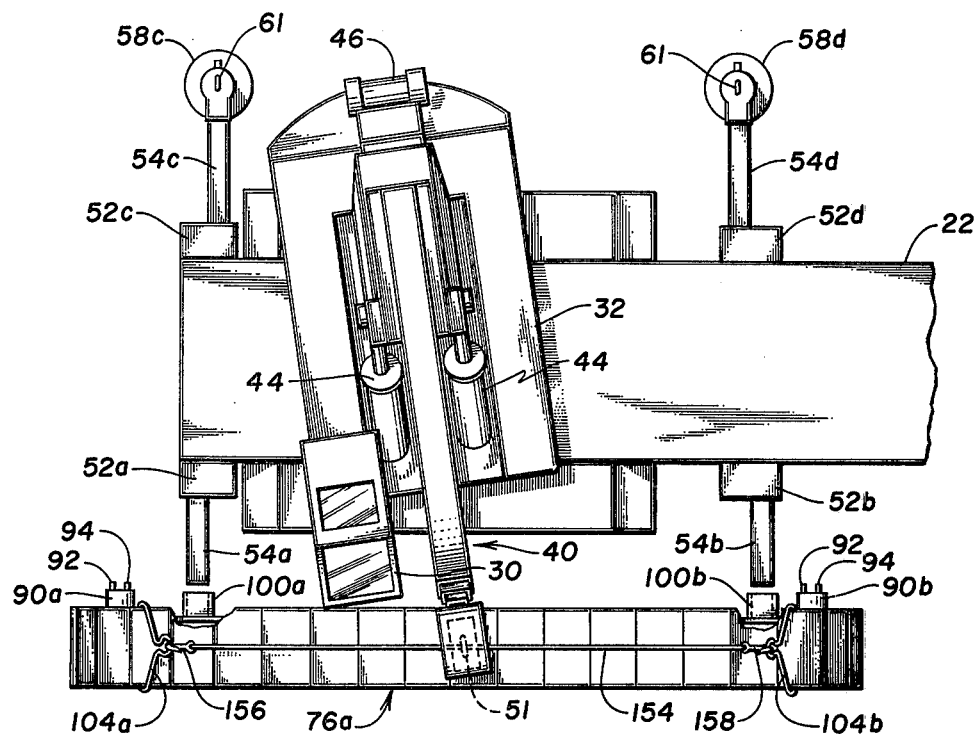
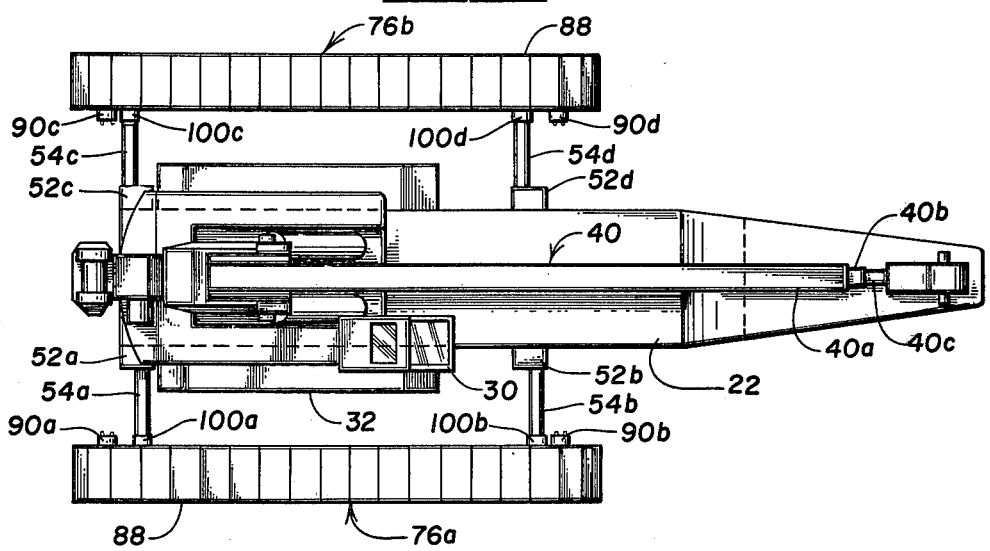
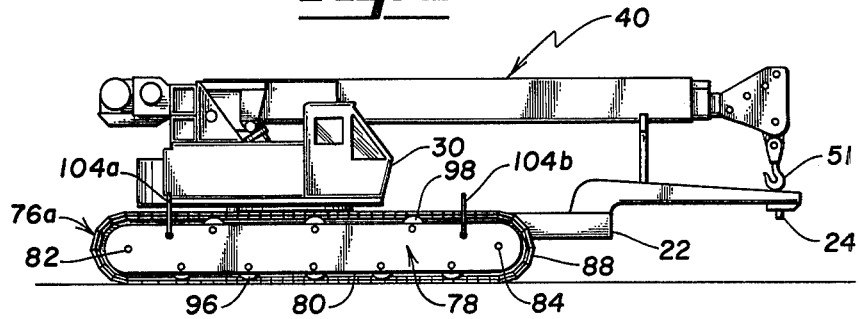

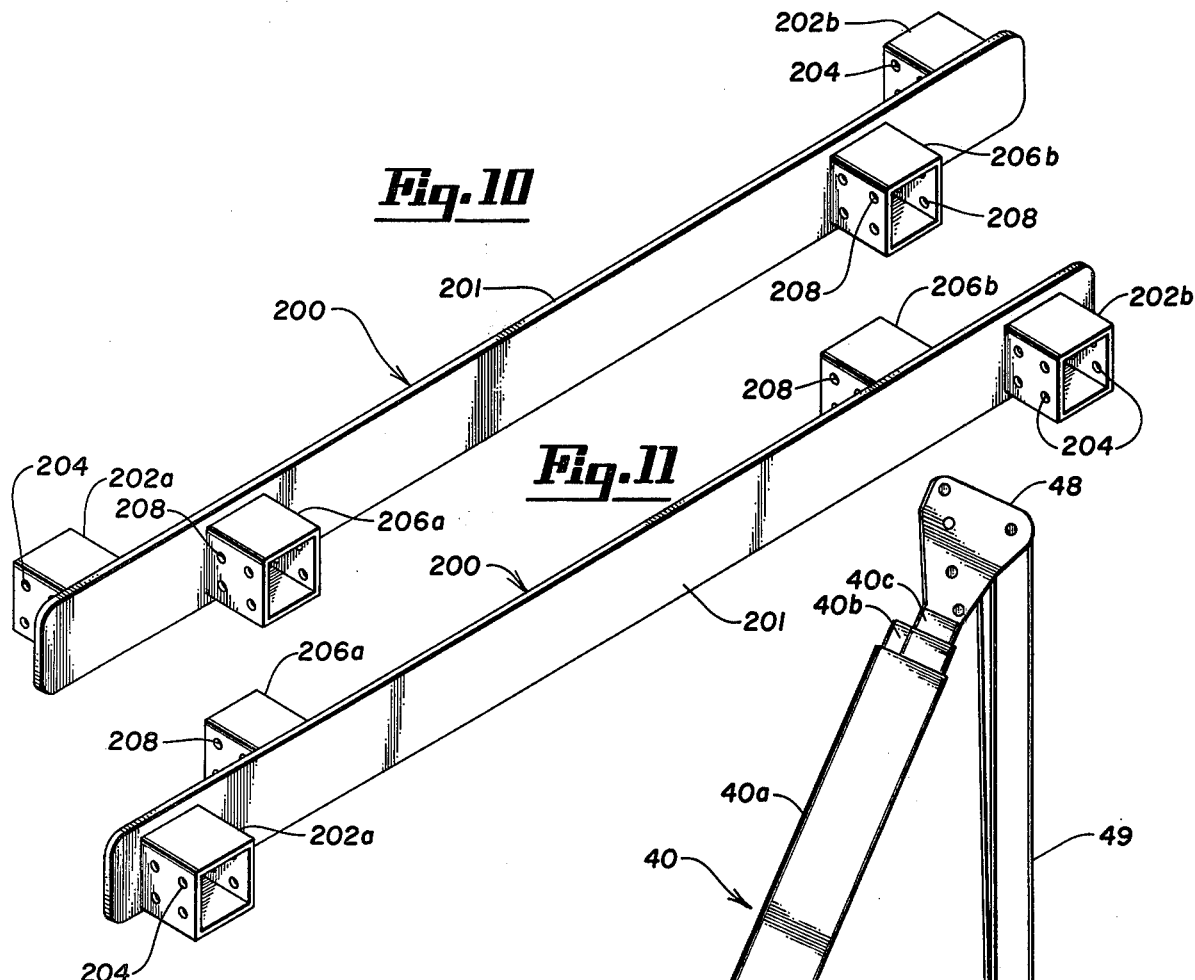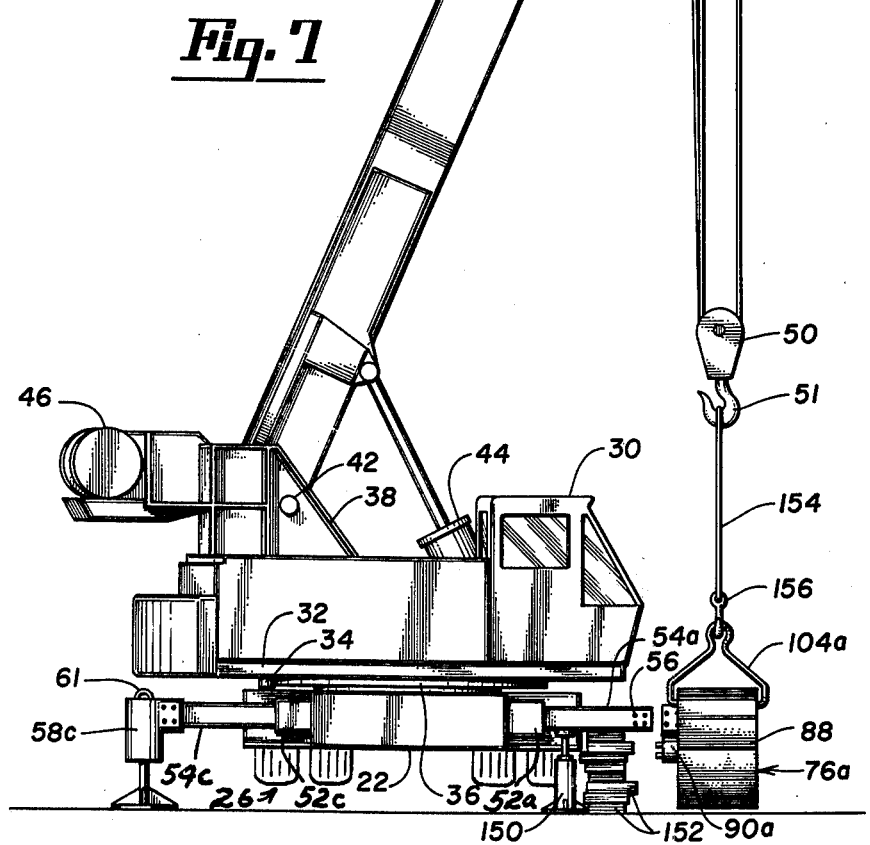

TRAILER CRANE WITH OUTRIGGER TO CRAWLER CONVERSION

BACKGROUND OF THE INVENTION

1. Field of the Invention

This invention relates generally to trailer cranes with outriggers and pertains more particularly to an arrangement for substituting hydraulically powered crawlers for the outriggers.

2. Description of the Prior Art

In order to transport more readily large or heavy duty cranes from place to place, the crane is mounted on a trailer which is pulled or towed by a tractor. While this arrangement functions admirably as far as covering relatively great distances between work locations, it poses a disadvantage or problem after the crane has reached the location where it is to perform its expected lifting function, and also other crane functions. More specifically, the overall length of the tractor and trailer make it such that various intricate and time-consuming movements of the tractor are required in order to effect what really amounts to only a simple shifting of the crane. In addition, the wheels on the trailer, and also the wheels on the tractor, have made it difficult to conduct the usual crane operations where the ground is relatively soft or muddy. Owing to the size of the crane, it is not always practical to equip the crane with permanently mounted crawlers thereon, for then the crane must be moved onto the trailer during the transporting thereof to the job site and removed from the trailer. The sheer size and weight of the crane militates against any such arrangement.

SUMMARY OF THE INVENTION

Accordingly, a general object of the invention is to render a trailer crane more maneuverable than heretofore. In this regard, it is planned that the outrigger jacks be removed from the outrigger beams and in lieu thereof hydraulically powered crawlers be substituted, one crawler for each side. In this way, the crane after reaching the job site is rendered much more maneuverable than if it remained coupled to the tractor. Stated somewhat differently, an aim of the invention is to retain the advantages of transporting a trailer crane by means of a conventional tractor, yet permitting a facile conversion thereof to a crawler-type operation after the trailer crane has reached its destination.

Another object is to enable the user to own only one crane rather than two. In the past, the user has purchased in some instances two cranes, one with wheels and one with crawlers, employing one or the other as circumstances require. When practicing my invention, the user need only purchase and maintain a single crane, making the conversion from wheels to crawlers or vice versa as desired. In this way, a decided financial saving is realized.

Briefly, my invention envisages the removal of the ground engageable jacks normally carried or mounted at the free ends of laterally reciprocable stabilizer beams. Inasmuch as optimum stabilizing occurs when four stabilizers in the form of jacks are utilized, provision is made for substituting a hydraulically powered crawler for each pair of stabilizer jacks. Once substituted, use can be made of the same hydraulic system employed for raising and lowering the jacks to furnish hydraulic fluid under pressure to achieve a forward or reverse operation of the rotary hydraulic motors which drive the crawlers.

BRIEF DESCRIPTION OF THE DRAWINGS

FIG. 1 is a side elevational view of a conventional tractor and crane trailer when coupled together;

FIG. 2 is a side elevational view corresponding to FIG. 1 but with the trailer uncoupled from the tractor and the outriggers extended;

FIG. 3 is a top plan view of the trailer with its outriggers extended as in FIG. 2;

FIG. 4 is an enlarged detail view of the free end portion of an outrigger beam and an outrigger jack attached thereto, the view being taken in the direction of line 4—4 of FIG. 3;

FIG. 4A is a view corresponding to FIG. 4 but with the outrigger jack detached from the outrigger beam;

FIG. 5 is a perspective view of a hydraulically powered crawler with appropriately sized box frames thereon for attachment to the free ends of the two outrigger beams at one side of the crane;

FIG. 6 is a top plan view of a crawler as it is being placed on the outrigger beams at one side of the crane, the outrigger jacks still being in place at the other side of the crane;

FIG. 7 is a view corresponding to FIG. 6 but looking forwardly from the rear of the trailer to show to better advantage the manner in which the crawler is attached to the outrigger beams;

FIG. 8 is a top plan view of the trailer after both crawlers have been attached;

FIG. 9 is a side elevational view corresponding to FIG. 8;

FIG. 10 is a perspective view of one side of an adapter that can be used in the mounting of a crawler, and FIG. 11 is a perspective view of the other side of the adapter of FIG. 10.

DESCRIPTION OF THE PREFERRED EMBODIMENTS

Referring to FIG. 1, it will be noted that a tractor 10 has been illustrated having the usual body 12, front wheels 14, rear wheels 16 and from FIG. 2 it will be discerned that the tractor also has what is commonly termed a "fifth wheel," this fifth wheel being labeled 18. A trailer 20 having a chassis 22 provided at its forward end with a plate member 24 by which it is coupled to the tractor 10, more specifically the fifth wheel 18 thereof. Owing to the heavy load that the trailer 20 must support, a bogy 26 is employed near the rear end of the chassis 22, the bogy in the exemplary instance comprising six wheels in order to adequately support the load.

The purpose of the trailer 20 is to carry thereon a crane 28. The crane 28 will be described as a hydraulic crane but it will be understood that the invention herein exemplified as equally suited for use with other types of cranes. A cab 30 is mounted on a swing platform 32 of the crane. The platform having a downwardly projecting pinion 34 which is in mesh with a swing gear 36 mounted on the chassis 22. Although the motor for rotating the pinion 34 is not depicted, it will be understood that the pinion 34 is rotated by the unshown motor to cause the platform 32 to rotate or swing about the gear 36.

A standard 38 is mounted on the rear of the swing platform 32. The function of the standard 38 is to pivotally support a boom assembly 40 composed of a main boom section 40a and two reach or extensible boom sections 40b and 40c which are telescopically received within each other. The main boom section 40a is pivotally mounted on the standard 38 at 42. A pair of hydraulic lift cylinders 44 permit the raising and lowering of the entire boom assembly 40 about the pivot 42. A winch 46 has a suitable cable wound thereon (not discernible) which extends along the boom assembly 40 to a boom head 48 at the free end of the reach boom section 40c. The visible portion of the cable from the winch 46, which has been labeled 49, is entrained about a pulley block or hook assembly 50 having a hook member 51 associated therewith.

As is conventional, the trailer 20 has a plurality of outrigger housings 52a, 52b, 52c and 52d fixedly carried thereon, these housings 52 constituting "tubes" having a rectangular cross section for the accommodation therein of an equal number of outrigger beams 54a, 54b, 54c and 54d. Inasmuch as the outrigger beams 54 and the housings 52 are conventional, it is not seen necessary to describe these components in any great detail; however, it will be appreciated that the beams are laterally extensible by hydraulic cylinders which are not illustrated.

As perhaps best understood from FIGS. 4A and 7, the free end of each outrigger beam 54 is provided in the illustrated instance with four holes 56. Although four jacks 58a, 58b, 58c and 58d are utilized, from FIG. 4 it will be discerned that the jack 58a appearing in this view clearly comprises a cylinder 60 having a lifting shackle or bail 61 extending upwardly from its closed end and a box frame 62 extending radially of a size so as to receive therein the free end of the outrigger beam 54a. The various box frames 62 are securely attached, as by welding, to the cylinders 60. Each box frame 62 has a plurality of holes 64 (FIG. 4A) equal in number to the holes 56 and registrable therewith so that removable pins 66 can be inserted through the holes 56, 64 when aligned to retain the jack 58 attached to the particular outrigger beam 54. Each jack 58 has a piston 68 and a piston rod 69 projecting downwardly from the lower or open end of its cylinder 60. A ground engageable pad or foot 70 is attached to the lower end of each piston rod 69.

Each cylinder 60 of the various jacks 58 has an upper hydraulic fitting 72 and a lower fitting 74. The hydraulic circuitry for supplying fluid under pressure to the jacks 58 can be made use of when practicing my invention or a separate system can be employed.

Even though hydraulically operated crawlers have heretofore been employed in conjunction with cranes, being used to propel the cranes from place to place, such means have not been used in the manner that I propose to employ them, more specifically in the conversion of a conventional trailer crane requiring towing to a crawler mode of operation permitting self propulsion.

Therefore, a pair of crawlers 76a and 76b are contemplated. Each crawler 76 is provided with an elongated frame 78 composed of, in the illustrated instance, a pair of beams 80 with suitable transverse connecting struts or trusses (not visible). It might be explained at this stage that the crawlers 76 are being only diagrammatically described inasmuch as they can assume various specific mechanical configurations. Adjacent the ends of the elongated beams 80 which are spaced but parallel, are shafts 82, 84. The shaft 82 has a pair of sprockets 86 (FIG. 5) keyed thereon and similarly the shaft 84 has keyed thereto a second pair of sprockets 86 (not visible). Entrained about the sprockets 86 is an endless track or articulated tread 88. Hydraulic drive motors 90a and 90b of the rotary type have their rotors coupled to the shafts 82, 84 as far as the crawler 76a is concerned. Hydraulic motors 90c and 90d are used in conjunction with the crawler 76b. Each motor has a pair of fittings 92 and 94, the fluid flow being into one fitting and out the other, thus causing rotation in one direction and vice versa. Still further, lower idler rollers 96 are mounted for rotation with respect to the frame 78 comprising the beams 80 and upper take-up rollers 98 are similarly mounted, the take-up rollers minimizing any slack that would otherwise exist in the upper reach of the endless track or tread 88. Idler and take-up rollers are quite common as far as crawlers are concerned, so no further attempt will be made to elaborate on the manner in which these components function.

Where space permits, the hydraulic drive motors 90a, 90b and 90c, 90d can have their casings mounted on the inboard elongated beam 80 (see FIG. 5) of the frames 78 for the crawlers 76a and 76b, respectively. However, the casings of these drive motors 90 can be mounted on the outboard beam 80 if circumstances so dictate. It will be understood, as already explained, that the crawlers 76a, 76b can differ in design. Consequently, it must be recognized that the crawlers 76a and 76b depicted and described herein have been presented in a rather schematic fashion.

Inasmuch as it is planned that there be the crawler 76a at one side and the crawler 76b at the other side of the trailer 20, a pair of box frames 100a and 100b are secured, here again as by welding, in this particular instance to the inboard elongated beam 80, having a longitudinal spacing corresponding to that of the outrigger beams 54a and 54b. These box frames 100a and 100b on the crawler 76a are of a size having a rectangular cross section such as to receive therein the free ends of the outrigger beams 54a and 54b as far as one side of the trailer 20 is concerned and the free ends of the outrigger beams 54c and 54d fit into corresponding box frames 100c and 100d on the crawler 76b as far as the other side of the trailer is concerned. Each box frame 100 is formed with a plurality of holes 102 equal in number to the holes 56 (and of course the holes 64) so that when the jacks 58 are removed, the holes 102 will align with the holes 56 so that the pins 66 can be reinserted to hold the box frames 100 firmly in place.

To facilitate the lifting of the crawlers 76a and 76b, each frame 78 is provided with a pair of lifting bails 104a and 104b having inturned ends welded to the beams 80. The manner in which these bails 104 are utilized will become apparent from what is set forth immediately below.

It is believed that FIGS. 6 and 7 adequately portray how the outrigger to crawler conversion is effected. First, individual hydraulic jacks 150 are placed under the two outrigger beams 54 extensible from one side of the trailer 20, for instance the outrigger beams 54a and 54b. The jacks 150 that are planned to be used are preferably hydraulic, and can be either manually actuated or operated from the crane's hydraulic system or a separate hydraulic system where a separate system is resorted to. Therefore, one side of the trailer 20 can be raised by means of two jacks 150 to such an extent that an appropriate number of blocks 152 can be placed under each of the two outrigger beams 54a and 54b to maintain an elevated condition without further reliance on the jacks 150.

Once the ends of the beams 54a and 54b have been raised via the individual jacks 150 and the insertion of the blocks 152 thereunder, then the jacks 58, more specifically 58a and 58b, can be detached and removed. All that need be done is to take out the various removable pins 66 so that the box frames 62 can be slid laterally off the ends of the outrigger beams 54a and 54b. The crawler 76a can then be attached to the free ends of the outrigger beams 54a and 54b, making use of the box frames 100a and 100b that are integral with the crawler 76a by reason of being welded to the frame 78, more specifically its inboard beam 104 in the exemplary case. It is presumed in the illustrated instance that is now being described that the spacing of the box frames 100a and 100b on the crawler 76a (and also on the crawler 76b) is equal to the longitudinal spacing between the outrigger beams 54a and 54b (and 54c and 54d). Thus, there is no problem in placing the box frames 100a and 100b over the free ends of the outrigger beams 54a and 54b.

It is intended that a sling 154 having hooks 156 and 158 at opposite ends thereof be used for rigging the crawlers 76. All that the user need do is to engage the hook 156 with one of the bails 104 and the other hook 158 with the other bail 104. It is further planned that the hook 51 carried on the hook assembly 50 of the crane 28 be employed in lifting each of the crawlers 76a, 76b.

When the removable pins 66 have been re-inserted, this time through the holes 102 in the two box frames 100a, 100b on the crawler 76a, then the auxiliary hydraulic jacks 150 are actuated sufficiently so as to permit the removal of the blocks 152, the lowering of these jacks 150 then causing the crawler 76a to be lowered so that its endless track or tread 88 engages the ground.

After attaching the crawler 76a, then the same procedure is resorted to in attaching the crawler 76b to the other side of the trailer 20, more specifically to the side thereof having the outrigger beams labeled 54c and 54d. Needless to say, the crawlers 76a and 76b are of a size such as when their treads 88 are engaging the ground the chassis 22 is maintained sufficiently elevated so that the six wheels constituting the bogy 26 do not engage the ground.

It will be understood that the hydraulic lines from whatever supply system is utilized are detached from the fittings 72 and 74 belonging to the hydraulic jacks 58a and 58b, this being done actually before the pins 66 are removed. At any rate, the lines are then attached to the various fittings 92 and 94 belonging to the hydraulic motors 90a, 90b, 90c and 90d.

The trailer 20 is now ready to be maneuvered from place to place at the job site so that the crane 28 can perform any number of hoisting and other crane operations. It will be appreciated that the maneuverability of the trailer 20 is greatly enhanced by reason of the use of the hydraulically powered crawlers 76a, 76b in contradistinction to the use of the tractor 10. Of course, it must be recognized that the tractor 10 is very useful in hauling or pulling the trailer 20 over fairly great distances, such as from one job site to the next job site. However, it is very difficult to maneuver the tractor 10 into various positions at a given job site, the particular crane functions frequently dictating a number of rather intricate movements that can be achieved far more readily with the crawlers 76a, 76b in contradistinction to having to rely on the tractor 10. For instance, it will be recognized that sharp turns can be negotiated with the crawlers 76a, 76b, namely causing the hydraulic motors 90a, 90b to be driven forwardly, these two motors being on the crawler 76a, and the motors 90c, 90d reversely at the same time, these latter two motors being on the crawler 76b. Such turns simply cannot be accomplished when the tractor 10 is still coupled to the trailer 20. It will also be recognized that the trailer 20 with the crawlers 76 thereon can traverse softer ground than it could with the wheels 26 carrying the weight. Still further, the tractor wheels 14, 16 are not involved when using the crawlers 76, thereby also eliminating any problem that might result from these wheels as well.

An embellishment of the invention has been pictured in FIGS. 10 and 11. In this arrangement, an adapter 200 in the form of a bar or plate 201 is contemplated having box frames 202a and 202b projecting from one side thereof. These frames 202a, 202b have the same longitudinal spacing as the outrigger beams 54a and 54b at one side and 54c and 54d at the other side of the trailer 20. Consequently, the box frames 202a and 202b are simply slipped over the free ends of, say, the outrigger beams 54a and 54b. Holes 204 in these box frames 202a, 202b would have the same locations as the holes 56 so that the pins 66 would retain the box frames 202a, 202b in place.

The other side of the plate 201 is equipped with oppositely extending box frames 206a and 206b having holes 208 therein which would have the same spacing as holes corresponding to holes 128 in the box frames 126a and 126b. However, it is recognized that some crawlers that could be used will vary in size and it is contemplated that whatever box frames are added that if the spacing in a longitudinal direction differs from the spacing of the outrigger beams 54 at one side of a given trailer 20, then the most appropriate spacing for the box frames for a particular crawler can be made through the agency of the adapter 200 (actually one adapter 200 for each side). It will also be appreciated that the box frames 206a, 206b can be of different elevations on the plate 201 with respect to the elevations at the box frames 202a, 202b, particularly where such a vertical difference is needed to maintain the bogies 26 off the ground; the vertical dimension or height of the plate 201 would be increased in such a case to permit the vertical displacement of the box frames 206 with respect to the box frames 202, as just mentioned.

Whereas the adapter 200 has been shown as an elongated plate 201, it will be appreciated that the adapter could constitute a frame where the added width would not be a handicap. Thus, it will be recognized that the adapter 200 provides for greater versatility where increased versatility is desirable. It will be further understood that the adapter 200, when used, can be either first attached to the outrigger beams 54 or first attached to the particular crawler. The manner of actually installing or mounting each crawler is virtually the same as already described.

I claim:

1. A trailer crane comprising an elongated chassis having forward and rear ends, coupling means at the forward end of the chassis for connecting said forward end to a tractor, wheel means near the rear end of the chassis for supporting said rear end so that said chassis can be pulled by a tractor, a crane carried on said chassis, first and second longitudinally spaced means at one side of said chassis for mounting a first pair of stabilizers, third and fourth longitudinally spaced means at the other side of said chassis for mounting a second pair of stabilizers, first and second crawlers each including a frame and an endless track, means for detachably mounting said first crawler to said first and second longitudinally spaced means, and means for detachably mounting said second crawler to said third and fourth longitudinally spaced means, whereby said crawlers can be employed in lieu of stabilizers to independently maneuver said trailer when said forward end is uncoupled from said tractor.

2. The combination of claim 1 in which said first and second and said third and fourth longitudinally spaced means each includes a laterally extending beam, and said respective detachable mounting means each includes a pair of members engageable with a pair of said beams.

3. The combination of claim 2 in which each of said pairs of members constitutes a box frame.

4. The combination of claim 3 in which each stabilizer also has a box frame, said crawler box frames corresponding in size to said stabilizer box frames.

5. The combination of claim 4 in which said beams have a rectangular cross section and said stabilizer and crawler box frames have a cross section corresponding to that of the projecting ends of said beams.

6. The combination of claim 5 in which each beam has a plurality of pin-receiving holes and said stabilizer and crawler box frames have a corresponding number of pin-receiving holes.

7. The combination of claim 6 in which said crawler box frames are fixedly secured to the frames of said crawlers and have a longitudinal spacing corresponding to that of said beams.

8. The combination of claim 7 including an adapter for each crawler, each adapter having a first pair of longitudinally spaced box frames engageable with the projecting ends of said beams and a second pair of longitudinally spaced box frames engageable with said crawler box frames.

9. The combination of claim 8 in which the longitudinal spacing of said beams at each side of said chassis is different from the longitudinal spacing of said crawler box frames, said first pair of adaptor box frames having a longitudinal spacing corresponding to that of said beams and said second pair of adapter box frames having a longitudinal spacing corresponding to that of said crawler box frames.

10. The combination of claim 1 in which each stabilizer includes a hydraulic jack and each crawler includes a pair of hydraulic motors, and hydraulic circuitry for said jacks, said hydraulic circuitry supplying fluid under pressure to said motors when said crawlers are substituted for said jacks.

11. The combination of claim 1 including a pair of lifting bails on each crawler.

12. The combination of claim 11 including a lifting bail on each stabilizer.

* * * * *